United States Patent
Bestgen et al.

(12) 
(10) Patent No.: US 6,260,037 B1
(45) Date of Patent: Jul. 10, 2001

(54) METHOD AND COMPUTER PROGRAM PRODUCT FOR IMPLEMENTING SKIP KEY PROCESSING FOR DATABASE GROUPING QUERIES INVOLVING AGGREGATE OPERATIONS BY USING ONE OR MORE INDICES

(75) Inventors: Robert Joseph Bestgen, Dodge Center; Randy Lynn Egan, Rochester; Thomas Paul Giordano, Rochester; Scott Joseph Heimer, Rochester; Carol Ledermann Ramler, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,738

(22) Filed: Feb. 9, 1999

(51) Int. Cl.⁷ .................................................. G06F 17/30
(52) U.S. Cl. ............................................ 707/4; 707/3
(58) Field of Search .............................. 707/1–5

(56) References Cited

U.S. PATENT DOCUMENTS 5,598,559 * 1/1997 Chaudhuri ............................... 707/2

* cited by examiner

*Primary Examiner*—Paul V. Kulik
(74) *Attorney, Agent, or Firm*—Joan Pennington

(57) ABSTRACT

A method and computer program product are provided for implementing skip key processing for database grouping queries involving aggregate operations using one or more indices in a computer system. First checking for a selected entry in a current group in a primary file is performed. Responsive to finding the selected entry in the current group, the set of records of the current group is ordered to provide an aggregate value in an aggregate field of the current group. Then checking for an excluded value in the aggregate field of the current group is performed. Responsive to not finding the excluded value in the aggregate field, a current entry is saved as a result for the group. Then checking for more groups in the primary file is performed. Responsive to finding more groups in the primary file, a unique key or prefix to the query index is obtained to position to a next group. When the selected entry in the next group is not found, then checking for more groups in the primary file is performed.

10 Claims, 4 Drawing Sheets

METHOD AND COMPUTER PROGRAM PRODUCT FOR IMPLEMENTING SKIP KEY PROCESSING FOR DATABASE GROUPING QUERIES INVOLVING AGGREGATE OPERATIONS BY USING ONE OR MORE INDICES

FIELD OF THE INVENTION

The present invention relates to the data processing field, and more particularly, relates to a method and computer program product for implementing skip key processing for database grouping queries involving aggregate operations by use of one or more indices in a computer system.

DESCRIPTION OF THE RELATED ART

When executing a database grouping query using an index, every entry within the file is examined to determine how its contents affect the group result. There are certain conditions for which the first entry encountered within each group will contain the results for the entire group. For those cases, processing every entry in every group does not make sense, and takes more time than is necessary for the query to complete. Take the following SQL select statement as an example:

Select A, min(x)

from somefile group by A

Assuming also an index over somefile defines both A and x as ascending key fields.

If the query is performed in such a manner to move forward through the file examining the entries, it is known that the very first entry in each group will contain the minimum (MIN) value for x for that group.

The example above describes a simple, non-join query, but the same holds true for nested loop join queries with the aggregate function in the join primary and even join secondaries.

Select F1.A, min(F2.x)

from F1, F2 group by F1.A

In this case, we could have two different indexes, one with an ascending key over F1.A and another with an ascending key over F2.x. Once again, if the query is executed such that we are moving forward through the file, the first entry in F2 that we position to will contain the min value for x within each group.

Performance for such queries would be greatly improved if we did not have to process every entry within each group, since we know the first entry will contain the group result.

SUMMARY OF THE INVENTION

A principal object of the present invention is to provide an improved method and computer program product for implementing skip key processing for database grouping queries involving aggregate operations by using one or more indices in a computer system. Other important objects of the present invention are to provide such method and computer program product for skip key processing for database grouping queries involving aggregate operations by using one or more indices, substantially without negative effects and that overcome some disadvantages of prior art arrangements.

In brief, a method and computer program product for implementing skip key processing for database grouping queries involving aggregate operations using one or more indices in a computer system. First checking for a selected entry in a current group in a primary file is performed. Responsive to finding the selected entry in the current group, the set of records of the current group is ordered to provide an aggregate value in an aggregate field of the current group. The checking for an excluded value, such as NULL in the aggregate field of the current group is performed. Responsive to not finding the excluded value in the aggregate field, a current entry is saved as a result for the group. Then checking for more groups in the primary file is performed.

In accordance with features of the invention, responsive to finding more groups in the primary file, a prefix of the index is obtained to position to a next group. When the selected entry in the next group is not found, then checking for more groups in the primary file is performed.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
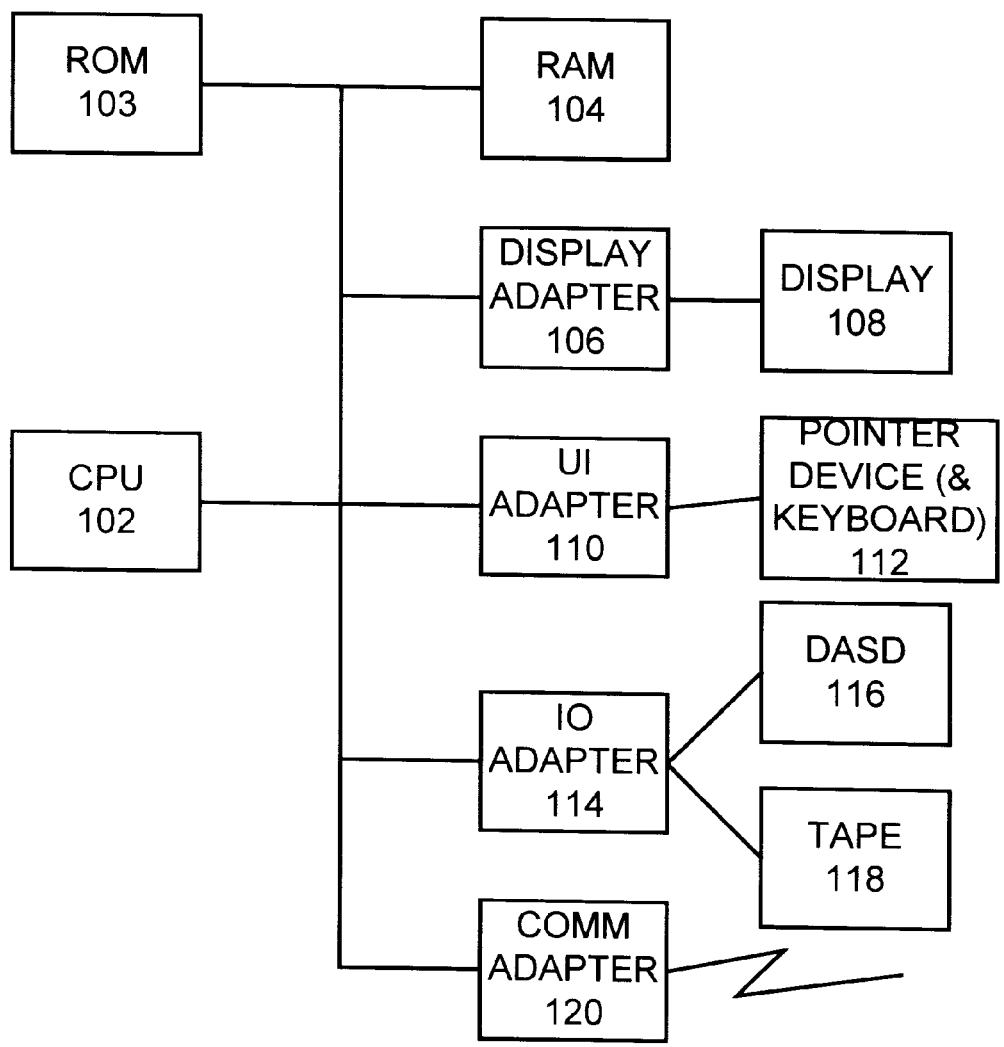
FIGS. 1 and 2 are block diagram representations illustrating a computer system and operating system for implementing a method and computer program product for skip key processing for database grouping queries involving aggregate operations using one or more indices in accordance with the preferred embodiment.
Figure 2:
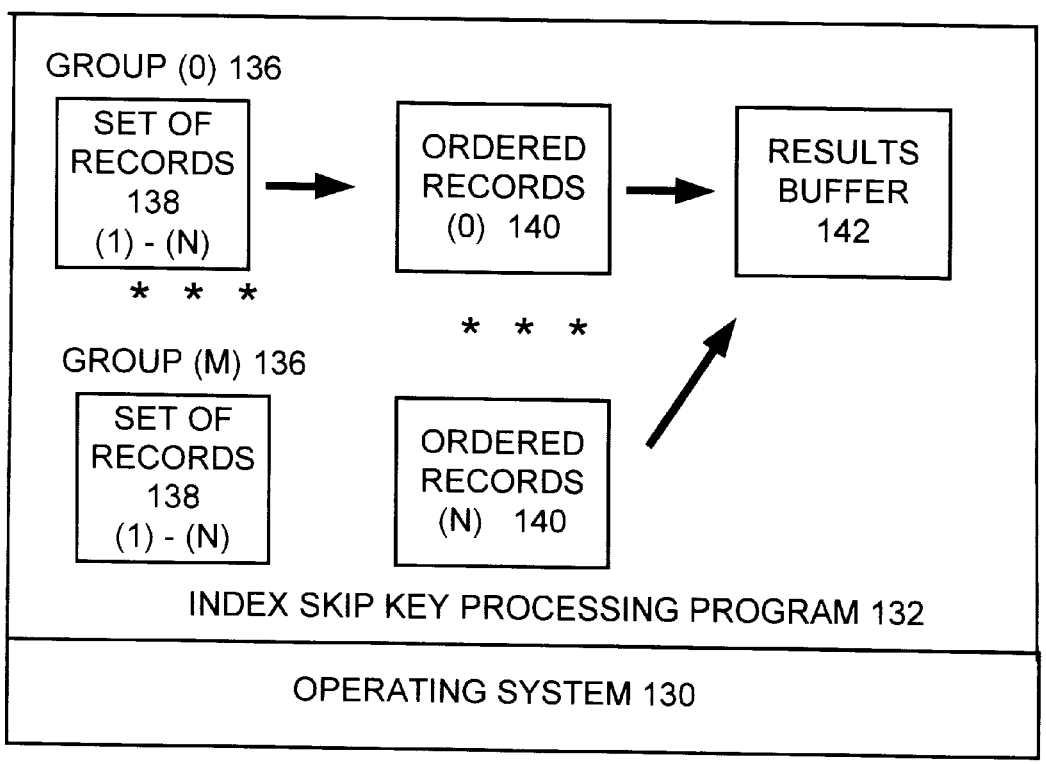

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130 and an index skip key processing program 132 of the preferred embodiment. Skip key processing program 132 processes a plurality of data groups (0–M) 136, each including a set of a plurality of data records (1–N) 138. The set of data records 138 are ordered by an aggregate operations to provide respective ordered records 140 for data groups 136. The ordered records 140 are ordered such that the first non-excluded record encountered for the group contains the aggregate value. A results buffer 142 stores results of database grouping queries.

Figure 3:
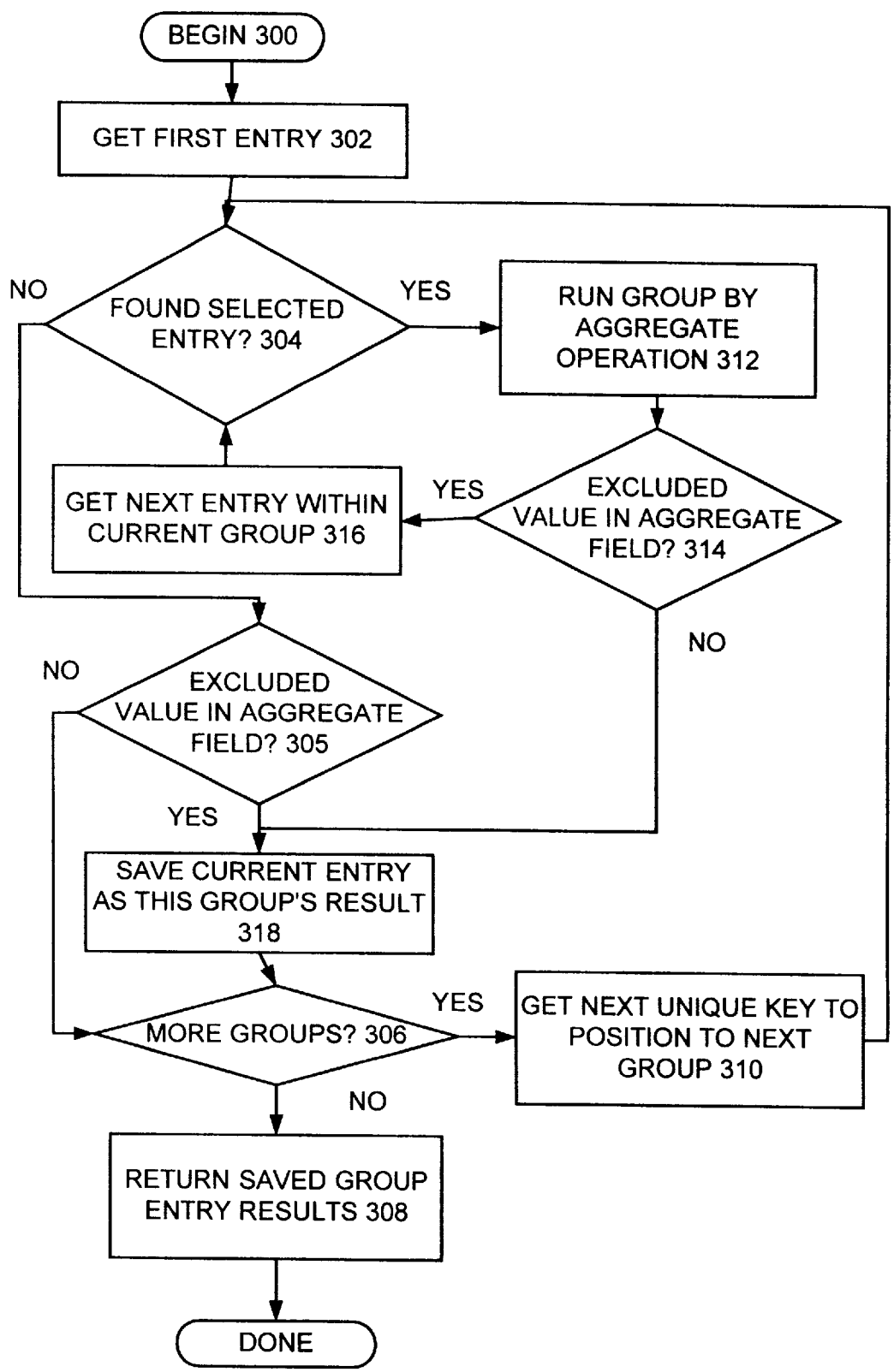
FIG. 3 is a flow chart illustrating exemplary steps for skip key processing for database grouping queries involving aggregate operations by use of one or more indices in a computer system of FIG. 1 in accordance with the preferred embodiment.

In accordance with features of the preferred embodiment, as may be understood with respect to FIG. 3, performance can be greatly improved by not processing any more entries than necessary for group by index queries that meet the criteria for skip key processing, for example, ascending index over MIN primitive field and searching forward through the file. As used in the present description and claims, the term "index skip key processing" means exiting processing on a group without examining all the entries within that group.

In accordance with features of the preferred embodiment, when the first entry with a special or excluded value for the aggregate operation is found, it is placed in the result buffer 142. Processing for that group 136 is then stopped. Then the first entry in the next group 136 is found by searching the index for the next unique key using the grouping fields as the key. To ensure that a non-excluded value will be returned, if one exists, skip key processing will be suspended if an excluded value is encountered in the aggregate field. While skip key processing is suspended, each entry within the group 136 is processed until a non-excluded value is found for the aggregate operation. If the end of the group is encountered and no non-excluded value is found, NULL will be returned for the aggregate operation for that group 136.

Skip key processing for join queries is similar. Unique key lookup is performed on the primary file using the grouping fields as the key. When an entry in the primary is located, processing is performed on the secondaries until reaching the first valid join position. This first valid join position in each group will contain the result for the group. The same rules apply for excluded values. If an excluded value is encountered skip key processing will be suspended and full processing of the secondaries will be performed until a non-excluded value is found for the aggregate operation or the end of the group is reached.

Referring now to FIG. 3, a file's entries are processed via an index to select entries into groups 136. As indicated at a block 302, a first entry is obtained. Then checking whether a selected entry in a current group is found is performed as indicated at a decision block 304. During processing of an entry, various selection criteria is applied to determine if it is a group candidate. Entries in the current group are processed until the group's first entry is selected. For those groups that do not have a single entry that passes selection at decision block 304, checking for an excluded value in an aggregate field is performed as indicated at a decision block 305. If an excluded value in the aggregate field is not found, checking for more groups is performed as indicated at a decision block 306. When no more groups are found at decision block 306, then the saved group entry results are returned as indicated at a block 308. If there are no entries for any group in the entire file that pass selection, NULL will be returned as the query result.

As indicated at a block 310, the next unique key, such as a prefix of the index, is obtained to position to the next group, after more groups are identified at decision block 306. Then checking for a selected entry in the group is performed at decision block 304. When the selected entry in the group is found at decision block 304, then the group is run by an aggregate operation as indicated at a block 312. Checking for an excluded value in the aggregate field is performed as indicated at a decision block 314. When an excluded value, such as NULL, is found in the aggregate field, a next entry within the current group is obtained as indicated at a block 316. Otherwise, when a non-excluded value is found at decision block 314; the current entry is saved as the current group's result as indicated at a block 318. When an excluded value in the aggregate field is found at block 305, then the excluded value is saved as the current group's result at block 318.

Join queries can be implemented due to the fact that when processing a new group begins at block 310, we always position to the next unique group in the primary file of the join. When the next entry is located within a group after encountering an excluded value at block 314, processing the secondary files is continued until the next valid join position is reached, just as would be done if the special skip key algorithm of the preferred embodiment were not being used. When processing the next group begins at block 310, we position to the next unique group in the primary file and then process the secondary files to reach the next valid join position.

Index skip key processing in general implies that, for the set of records of each group, the records are ordered such that the first non-excluded record encountered for the group contains the aggregate value. For a simple query, this implies that the records are ordered first by the grouping columns (to ensure all records of a particular group are ordered together) and then by the column involved in the aggregate operation at block 312 of FIG. 3. For example:

SELECT MAX(COL2)
FROM TABLEA
GROUP BY COL1

An index with key fields COL1, COL2 can be used to perform skip key processing. Note that the key ordering (ascending or descending) is immaterial to its usage in this case, since the grouping fields need only be order together and skip key processing retrieves either the first-of-group or last-of-group record to satisfy the aggregate operation or request. In this example, the last-of-group record is retrieved if the index specifies ascending for COL2 and the first-of-group record is retrieved if the index specifies descending for COL2. Note that if an excluded value, such as NULL, is encountered for the COL2 column, the operation continues with a next-of-operation.

Index skip key processing is also possible for queries with implied grouping using the same logic:

SELECT MAX (COL3)
FROM TABLEA

Since all records are involved in the (one) group, the grouping column becomes a don't-care condition and an index with a key field COL3 can be used to perform skip key processing. Again, key ordering is immaterial as processing is simply retrieving either the first non-excluded record, respectively.

Index skip key processing is possible whenever candidate records of each given group are ordered by grouping, then an aggregate operation, such as MIN/MAX, columns. This easily extends to more complex examples involving selection. In fact, the selection can be used as key field fillers, as long as the selection does not affect the ordering requirement of grouping columns then MIN/MAX columns. In general, isolatable selection involving the equals predicate can be used, since equal selection does not affect ordering. For example:

SELECT MAX(COL3)
FROM TABLEA
WHERE COL1=value
GROUP BY COL2

An index with key fields of COL1, COL2, COL3 provides skip key capability; an index with key fields of COL2, COL1, COL3 can also be used.

Index skip key processing can be extended to join queries, as long as the requirements to order grouped records followed by aggregate, such as MIN/MAX column(s) is satisfied. This processing is most easily understood if all grouping columns and the MIN/MAX column are from a single table. For example:

```
SELECT MAX(A.COL2)
FROM A, B
GROUP BY A.COL1
```

Assuming the results are ordered by COL1, COL2 of table A, skip key processing proceeds normally. The only addition is that the join processing can be avoided once a candidate record is found for a given group.

Join queries can be enhanced by implication using the same ordering rules already described. For example:

```
SELECT MAX(B. COL2)
FROM A, B
GROUP BY A.COL1
```

Using two indexes, one keyed on COL1 for table A and the other index keyed on COL2 of table B, skip key processing can proceed as long as the join is implemented via positioning into table A first (to ensure ordering on grouping columns first) followed by positioning into table B (to satisfy ordering on the MAX field second). This is most often done as, but is not limited to, a nested loop join from table A to table B.

Join queries have the advantage of providing a way to satisfy more than one MIN/MAX operation per query; since on MIN/MAX operation is permitted per table, joins allow for multiple MIN/MAX operations (one per table). For example:

```
SELECT MIN(A.COL3), MAX(B.COL2)
FROM A, B
GROUP BY A.COL1
```

Using two indexes, one keyed on COL1, COL3 for table A and the other index keyed on COL2 of table B, skip key processing can proceed normally (assuming again that positioning into table A occurs first), but with the added advantage of satisfying multiple MIN/MAX operations.

Most often, however, join queries involve record selection in order to be useful to the query user. By use of the don't care condition of equal selection already described above, join queries of this nature can also support skip key processing, so long as the ordering requirement is maintained. For example:

```
SELECT MAX(B.COL2)
FROM A, B
WHERE A.COL3=value1
AND B.COL3=value2
GROUP BY A.COL1
```

Using two indexes, one keyed on either COL1 or COL3, COL1 for table A and the other index keyed on either COL2 or COL3, COL2 of table B, skip key processing can proceed normally. Note that the selection must be satisfied for the candidate record before skip key processing can be applied.

Join queries involving join predicates (a predicate involving columns from two tables) can also have skip key processing applied, so long as the ordering requirement is maintained. For example:

```
SELECT MAX(B.COL2)
FROM A, B
WHERE A.COL1=B.COL1
GROUP BY A.COL1
```

Using two indexes, one keyed on COL1 for table A and the other index keyed on COL1, COL2 of table B, skip key processing can proceed normally. This processing is possible by taking advantage of implied grouping columns due to transitive closure (B.COL1 in this case).

Note, however, that join queries cannot use just 'any' equal selection join predicate. Join predicates are only usable if all of the columns specified before the aggregate operation column are group columns. For example:

```
SELECT MAX(B.COL2)
FROM A, B
WHERE A.COL3=B.COL3
GROUP BY A.COL1
```

This query cannot use indices to take advantage of skip key processing since the ordering of group columns first then MIN/MAX column second is not preserved (MIN/MAX column is ordered third after COL3).

Support of skip key is possible whenever the ordering of the grouping and MIN/MAX columns is guaranteed. While this implies that skip key processing can be used for queries where a sort is applied, the primary advantage of index skip key processing is almost completely lost.

Figure 4:
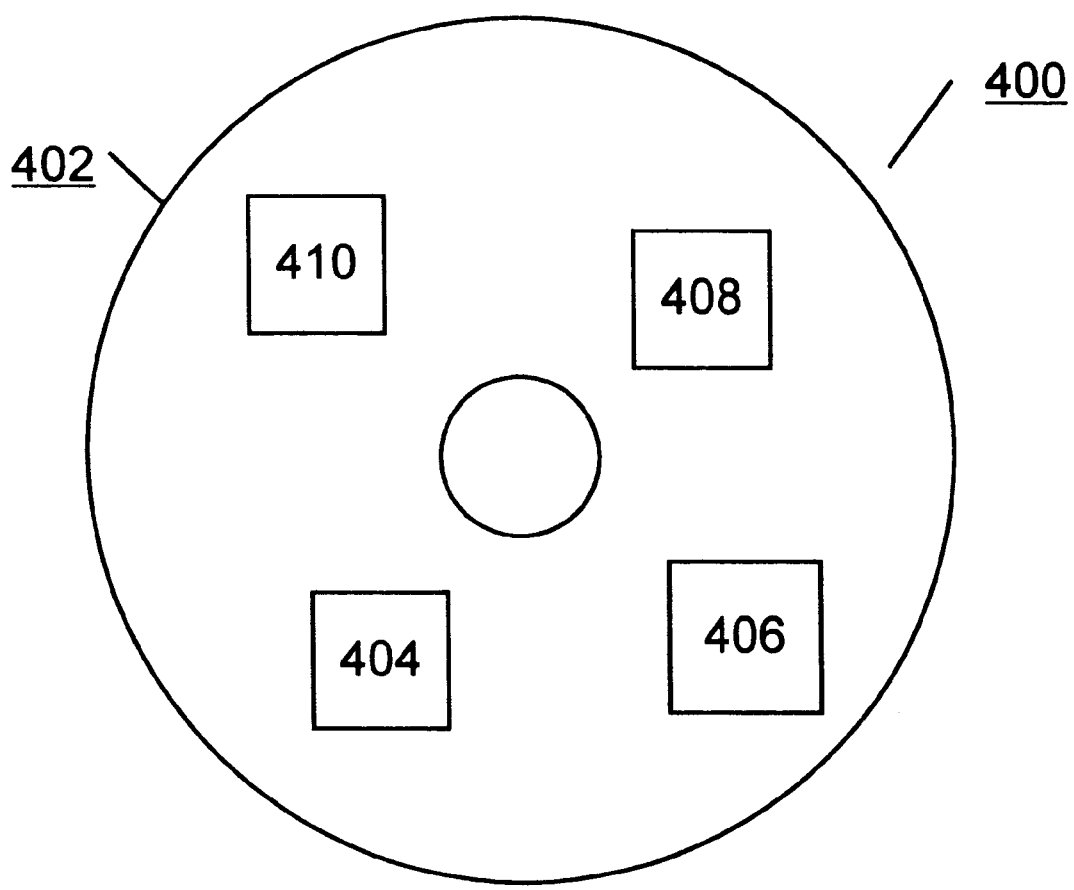
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for skip key processing for database grouping queries involving aggregate operations using one or more indices of the preferred embodiment in the system 100 of FIGS. 1 and 2.

A sequence of program instructions or a logical assembly of one or more interrelated modules defined by the recorded program means 404, 406, 408, 410, direct the computer system 100 for implementing skip key processing for database grouping queries involving aggregate operations using one or more indices of the preferred embodiment.

While the present invention has been described with reference to the details of the embodiments of the invention shown in the drawing, these details are not intended to limit the scope of the invention as claimed in the appended claims.

What is claimed is:

1. A method for implementing skip key processing for database grouping queries involving aggregate operations comprising the steps of:

checking for a selected entry in a current group of in a primary file;

responsive to finding said selected entry in said current group, ordering a set of records of said current group to provide an aggregate value in an aggregate field of said current group;

checking for an excluded value in said aggregate field of said current group;

responsive to not finding said excluded value in said aggregate field, saving a current entry as a result for current group; and checking for more groups in said primary file.

2. The method for implementing skip key processing for database grouping queries involving aggregate operations as recited in claim 1 further includes the step responsive to finding more groups in the primary file, of obtaining a next unique key to position to a next group.

3. The method for implementing skip key processing for database grouping queries involving aggregate operations as recited in claim 1 further includes the step responsive to said selected entry in said current group not being found, of checking for more groups in the primary file.

4. The method for implementing skip key processing for database grouping queries involving aggregate operations as recited in claim 1 wherein said step of ordering said set of records of said current group to provide said aggregate value in said aggregate field of said current group includes the step running said group by an aggregate operation.

5. A computer program product for implementing skip key processing for database grouping queries involving aggregate operations in a computer system comprising:

a recording medium;

means, recorded on the recording medium, for checking for a selected entry in a current group of in a primary file;

means, recorded on the recording medium, responsive to finding said selected entry in said current group, for ordering a set of records of said current group to provide an aggregate value in an aggregate field of said current group;

means, recorded on the recording medium, for checking for an excluded value in said aggregate field of said current group;

means, recorded on the recording medium, responsive to not finding said excluded value in said aggregate field, for saving a current entry as a result for current group; and means, recorded on the recording medium, for checking for more groups in said primary file.

6. The computer program product for implementing skip key processing for database grouping queries involving aggregate operations as recited in claim 5 further includes means, recorded on the recording medium, responsive to finding more groups in the primary file, for obtaining a next unique key to position to a next group.

7. The computer program product for implementing skip key processing for database grouping queries involving aggregate operations as recited in claim 5 further includes means, recorded on the recording medium, responsive to said selected entry in said current group not being found, for checking for more groups in the primary file.

8. A computer system comprising:

a processor, a memory coupled to the processor for storing a computer program product for implementing skip key processing for database grouping queries involving aggregate operations using one or more indices; said computer program product including a plurality of computer executable instructions stored on a computer readable medium, wherein said instructions, when executed by said computer, cause the computer to perform the steps of:

checking for a selected entry in a current group of in a primary file;

responsive to finding said selected entry in said current group, ordering a set of records of said current group to provide an aggregate value in an aggregate field of said current group;

checking for an excluded value in said aggregate field of said current group;

responsive to not finding said excluded value in said aggregate field, saving a current entry as a result for current group; and checking for more groups in said primary file.

9. The computer system of claim 8 wherein said instructions, when executed by said computer, further cause the computer to perform the step of responsive to finding more groups in the primary file, of obtaining a next unique key to position to a next group; said next unique key including a prefix of a query index.

10. The computer system of claim 8 wherein said instructions, when executed by said computer, further cause the computer to perform the steps responsive to said selected entry in said current group not being found, of checking for more groups in the primary file.

* * * * *